No. 680,266. Patented Aug. 13, 1901.
W. V. McMANUS.
PROCESS OF PREPARING RUBBER ADULTERANT.
(Application filed Aug. 24, 1899.)
(No Model.)
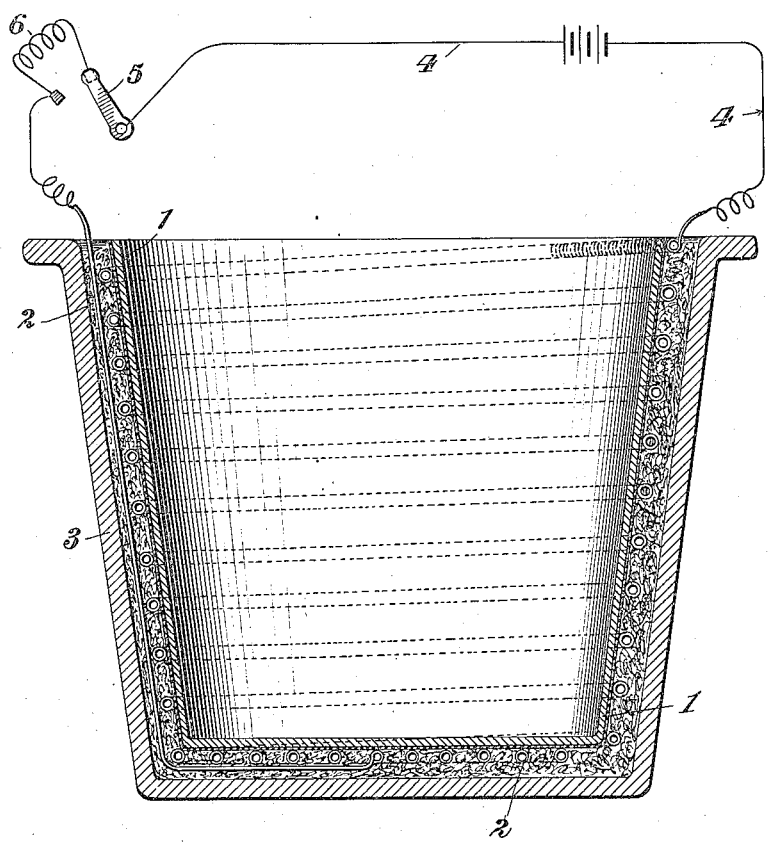
Witnesses
Edward C. Rowland.
Chester A. Gardener.
William V. McManus.
Inventor
By his Attorney H. Mackay

UNITED STATES PATENT OFFICE.

WILLIAM V. McMANUS, OF NEW YORK, N. Y.

PROCESS OF PREPARING RUBBER ADULTERANT.

SPECIFICATION forming part of Letters Patent No. 680,266, dated August 13, 1901.

Application filed August 24, 1899. Serial No. 728,277. (No specimens.)

*To all whom it may concern:*

Be it known that I, WILLIAM V. MCMANUS, a citizen of the United States, residing in the city, county, and State of New York, have invented a certain new and useful Improvement in Processes of Preparing Rubber Adulterants, of which the following is a specification.

My present invention relates to a process of preparing adulterants for india-rubber; and it is the object of said invention to provide a process whereby there may be produced a relatively cheap adulterant slow to oxidize and possessed of a maximum degree of resilience.

In one broad aspect my present invention covers certain definite steps for the granulation and modification in the presence of heat from any source of certain basic materials, one being an oil and the other a mineral substance more or less vulcanizable in connection with oils.

In another broad aspect my present invention covers the practical application to all granulating processes of the class named of my discovery of the specific benefits derived in this connection from use of electric influence simultaneously with heat.

My claims are therefore separately directed to these separate broad improvements as well as to certain minor details hereinafter described.

While my present invention is not concerned with any details of apparatus, the accompanying drawing illustrates in vertical section one preferred type of apparatus which I have found useful in practice where electric influence is employed.

In describing my improved process I shall first set forth the details touching the preferred materials, proportions, and treatments employed for preparing a specific quantity of my adulterant and shall then point out the scope of equivalents as I understand them. Lastly, I shall explain the use of electricity in my process and its benefits.

Assuming that ten pounds of adulterant is to be prepared, I thoroughly mix five pounds of rape-seed oil with five pounds of powdered graphite and heat the mixture in a suitable non-corrodible vessel to about 110° Fahrenheit. When these materials are well mixed and heated, as described, I sprinkle them with eight liquid ounces of sulfuric acid (say sixty-six per cent. pure) and six liquid ounces of chlorid of sulfur, either separately or by placing both liquids in a sprinkler and sprinkling the two together. During this sprinkling process the mass should be violently agitated in order that all parts thereof may be affected. This sprinkling process should occupy about one minute with the quantities of material above named. The semiliquid mixture of oil and plumbago when thus sprinkled is modified in consistency, becoming granular and separating in lumps of a resilient rubber-like quality. After the process above described the granular material resulting consists of my improved adulterant, together with certain impurities, chiefly sulfuric acid, as the chlorid of sulfur is volatile and its superfluous residue passes off spontaneously. In order to get rid of these impurities, I resort to boiling and subsequent prolonged washing with caustic soda. This is continued until there is no acid reaction with litmus-paper. I prefer to grind my granulated material finely before this washing with soda. For this purpose I find that it is best to keep water running freely through the mill while grinding. This aids in carrying off the free sulfuric acid and insures pulverizing instead of mere crushing of the granules. The ground material when freed from impurities, as above described, is ready for incorporation with india-rubber in the well-known manner.

This invention is broader in scope than is merely sufficient to cover the details above described. I prefer to use plumbago, for instance, because I thereby produce a black adulterant without recourse to special pigments. Where a white adulterant is acceptable, white lead or zinc oxid may be substituted. Indeed it is not necessary that the plumbago used should be pure. I have found a cheap graphite containing a large percentage of clay to be useful in this connection. Other oils, too, besides rape-seed oil will answer the purpose. What is known as "colza" oil will be found useful in this connection, and I desire to cover in my claims the use of other oils which may be found suitable by experiment in this connection. The oil and the solid material used therewith are termed by me "basic materials," as it is by their modification by substances afterward eliminated that I produce my adulterant. Any solid mineral basic material comes within my invention so long as it is more or less vulcanizable in connection with oils. It is also to be understood that the proportions and temperatures hereinbefore named are not absolutely essential, as some degree of latitude may be permitted without departing from my invention.

I have discovered that my process is best practiced by subjecting the materials treated to the simultaneous influence of heat and electricity. Where heat is employed without the influence of adjacent electric currents, the use of caustic soda for removing impurities is necessarily carried to such a point as to materially prejudice the final result. By using electric influence and heat combined during and before the sprinkling stage of my process the following advantages are obtained: first, great saving in the amount of chemicals used; second, complete elimination of the sulfuric acid and chlorid of sulfur after they have accomplished the modification of the basic materials; third, the creation and retention of much of the resiliency of my perfected product; fourth, much greater non-oxidizing properties, both in my adulterant and in the rubber after addition of the adulterant, and, fifth, saving of much time in the elimination of impurities.

In my preferred treatment involving electric influence I employ a vessel, as 1, surrounded by insulated electric-resisting conductors 2, the whole being surrounded by an outer shell or casing 3. In practice I prefer to use the wires 2 for developing the necessary heat for bringing the basic materials to the temperature necessary for sprinkling. These materials are charged in the vessel 1 for this purpose. I prefer to employ sufficient current to raise the initial temperature of the vessel to about 300° Fahrenheit. For this purpose the electric mains 4 may be supplied with current at a potential sufficient to produce the higher temperature required, a switch 5 being used, whereby resistances 6 might be introduced for lowering the temperature of the vessel to 110° Fahrenheit. With this apparatus I first throw the full potential of the mains upon the wires, maintaining this connection for a short interval of time. I have found that this sets up an influence within the vessel, which is maintained when, after a short interval of time, the resistances 6 are introduced and the temperature of the vessel is held at 110° Fahrenheit. These changes may, if desired, be accomplished before introduction of the mass within the vessel, since the high initial potential is intended to simply start an electromagnetic condition and not to establish a certain thermal condition. I have found that by use of these expedients the modification of the basic material is greatly promoted, the sulfuric acid and chlorid of sulfur are prevented from incorporating themselves inextricably with the mass, and in consequence the cost in labor, materials, and time of eliminating said reagents is greatly lessened.

Where the electric influence is omitted, the treatment with caustic soda should be continued for a number of days, and even when at last the litmus-paper shows no acid reaction I have found that time developed such a reaction afterward. Furthermore, the protracted use of soda as described makes a harsh product, oxidizable with relative ease and of inferior resilience. Where, on the other hand, electric influence is employed, I am able to thoroughly eliminate all impurities after grinding by one brief washing with cold dilute caustic soda followed by washing with clear water. Consequently my final product is velvety, resilient, and hard to oxidize and may be prepared, ground, and purified within the space of a few hours. Indeed I have found that rubber incorporating my best adulterant actually oxidizes and deteriorates less rapidly than rubber without any adulterant other than filling in it.

The use of two different degrees of electric influence is not essential to my process; but I have found it to give the best results.

I have found that my adulterant can be used to the best advantage in a mixture containing four parts of adulterant to six parts of pure rubber. This is about twice the proportion of adulterant hitherto possible to use with advantage.

What I claim is—

1. The process of preparing rubber adulterant which consists in mixing an appropriate oil with a solid mineral more or less vulcanizable with oils, heating the mixture, sprinkling the heated mass with sulfuric acid and chlorid of sulfur and then treating with alkali to remove the superfluous acid.

2. The process of preparing rubber adulterant which consists in mixing rape-seed oil with a solid mineral more or less vulcanizable with oils, heating the mixture, sprinkling the heated mass with sulfuric acid and chlorid of sulfur and then treating with alkali to remove the superfluous acid.

3. The process of preparing rubber adulterant which consists in mixing rape-seed oil with a graphitic solid, heating the mixture, sprinkling the heated mass with sulfuric acid and chlorid of sulfur and then treating with alkali to remove the superfluous acid.

4. The process of preparing rubber adulterant which consists in subjecting appropriate basic materials to the simultaneous influence of heat and adjacent electric current, and sprinkling the mass thus heated with sulfuric acid and chlorid of sulfur.

5. The process of preparing rubber adulterant which consists in subjecting appropriate basic materials to a high temperature developed by adjacent electric current and sprinkling the heated mass with sulfuric acid and chlorid of sulfur.

6. The process of preparing rubber adulterant which consists in mixing an appropriate oil with a solid mineral more or less vulcanizable with oils, heating the mixture, sprinkling the heated mass with sulfuric acid and chlorid of sulfur and grinding the resultant granules in running water.

WILLIAM V. McMANUS.

Witnesses:
HERBERT L. FORDHAM,
HAROLD S. MACKAYE.